US 9,252,638 B2

(12) United States Patent
Akutsu et al.

(10) Patent No.: US 9,252,638 B2
(45) Date of Patent: Feb. 2, 2016

(54) ROTARY ELECTRIC MACHINE

(75) Inventors: Satoru Akutsu, Tokyo (JP); Isao Sonoda, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 178 days.

(21) Appl. No.: 13/991,507

(22) PCT Filed: Apr. 20, 2011

(86) PCT No.: PCT/JP2011/059717
§ 371 (c)(1),
(2), (4) Date: Jun. 4, 2013

(87) PCT Pub. No.: WO2012/144029
PCT Pub. Date: Oct. 26, 2012

(65) Prior Publication Data
US 2013/0257185 A1    Oct. 3, 2013

(51) Int. Cl.
*H02K 5/00*    (2006.01)
*H02K 3/50*    (2006.01)
*H02K 5/08*    (2006.01)
*H02K 5/173*   (2006.01)
*H02K 7/116*   (2006.01)
(Continued)

(52) U.S. Cl.
CPC .. *H02K 3/50* (2013.01); *H02K 5/02* (2013.01); *H02K 5/06* (2013.01); *H02K 5/08* (2013.01); *H02K 5/1732* (2013.01); *H02K 7/1166* (2013.01); *H02K 11/0031* (2013.01); *H02K 11/0073* (2013.01); *H02K 5/15* (2013.01); *H02K 5/225* (2013.01)

(58) Field of Classification Search
CPC .............. H02K 9/22; H02K 3/50; H02K 5/08
IPC ........................................ H02K 9/22, 3/50, 5/08
See application file for complete search history.

(56) References Cited

U.S. PATENT DOCUMENTS 5,073,735 A * 12/1991 Takagi ............................ 310/71
5,939,807 A *  8/1999 Patyk et al. ..................... 310/89
(Continued)

FOREIGN PATENT DOCUMENTS

| CN | 1736014 A | 2/2006 |
|----|-----------|--------|
| JP | 2005-306050 A | 11/2005 |
| JP | 3774624 A | 2/2006 |
| JP | 2009-298246 A | 12/2009 |

OTHER PUBLICATIONS

Japanese Office Action (Notification of Reasons for Refusal), issued Feb. 12, 2014, Application No. 2013-510776.
(Continued)

*Primary Examiner* — Dang Le
(74) *Attorney, Agent, or Firm* — Sughrue Mion, PLLC; Richard C. Turner

(57) ABSTRACT

A rotary electric machine according to the present invention is a rotary electric machine including: a heat sink mounted with a power circuit; a housing for containing incorporated components; and a frame for containing a rotor and a stator core; the heat sink, the housing, and the frame being coaxially and integrally configured. In the rotary electric machine, there are included a lead frame connected to a power circuit, and a connector portion connected to the lead frame and being for connecting to the outside; the heat sink is made of metal; and the housing is made of resin.

18 Claims, 20 Drawing Sheets

(51) Int. Cl.
*H02K 11/00* (2006.01)
*H02K 5/02* (2006.01)
*H02K 5/06* (2006.01)
*H02K 5/15* (2006.01)
*H02K 5/22* (2006.01)

(56) References Cited

U.S. PATENT DOCUMENTS

2002/0060105 A1* 5/2002 Tominaga et al. ............ 180/443
2005/0183902 A1   8/2005 Segawa et al.
2007/0023421 A1   2/2007 Kitamura et al.

OTHER PUBLICATIONS

Communication dated Jun. 26, 2015 from the State Intellectual Property Office of the People's Republic of China in counterpart application No. 201180066386.0.

Communication dated Feb. 9, 2015, issued by the State Intellectual Property Office of the People's Republic of China in counterpart Application No. 201180066386.0.

Communication dated Oct. 27, 2015 from the European Patent Office in counterpart European Application No. 11864109.1.

* cited by examiner

ROTARY ELECTRIC MACHINE

CROSS REFERENCE TO RELATED APPLICATIONS

This application is a National Stage of International Application No. PCT/JP2011/059717 filed Apr. 20, 2011, the contents of all of which are incorporated herein by reference in their entirety.

TECHNICAL FIELD

The present invention relates to a rotary electric machine integrated with a driving device, which is applied to, for example, an electric power steering apparatus.

BACKGROUND ART

In a conventional rotary electric machine integrated with a driving device, which is applied to, for example, an electric power steering apparatus, a lead frame and connectors are integrally formed with resin and a metal-made housing and a heat sink are configured to be directly connected (see, for example, Patent Document 1).

PRIOR ART DOCUMENT

Patent Document

Patent Document 1: Japanese Patent Gazette No. 3774624 (Page 1, FIG. 2)

DISCLOSURE OF THE INVENTION

Problems to be Solved by the Invention

In a conventional rotary electric machine shown in the aforementioned Patent Document 1, a lead frame ("circuit case" in Patent Document 1) and a connector portion ("first connector" and "second connector" in Patent Document 1) are integrally formed with resin, and a metal-made housing and a heat sink are configured to be directly connected; and therefore, it becomes a configuration including four portions of the heat sink, the lead frame, the housing, and the rotary electric machine ("electric motor" in Patent Document 1) in the axial direction of the rotary electric machine. Accordingly, problems exist in that it becomes heavy in weight, assembling workability is not good, and there is a possibility to resonate because the vibration of the rotary electric machine is transmitted to members on the other side (speed reduction mechanism) via the housing.

The present invention has been made to solve the foregoing problem, and an object of the present invention is to obtain a rotary electric machine which is lightweight, is easy in assembly, can reduce the number of components, and can suppress the vibration of the rotary electric machine from being transmitted to members on the other side.

Means for Solving the Problems

According to the present invention, there is provided a rotary electric machine including: a heat sink mounted with a power circuit; a housing for containing incorporated components; and a frame for containing a rotor and a stator core; the heat sink, the housing, and the frame being coaxially and integrally configured. In the rotary electric machine, there are included a lead frame connected to a power circuit, and a connector portion connected to the lead frame and being for connecting to the outside; the heat sink is made of metal; and the housing is made of resin.

Advantageous Effect of the Invention

According to the present invention, there can be obtained a rotary electric machine which is lightweight, is easy in assembly, can reduce the number of components, and can suppress the vibration of a motor from being transmitted to members on the other side while securing heat dissipation properties of a power circuit.

MODE FOR CARRYING OUT THE INVENTION

Embodiment 1

Figure 1:
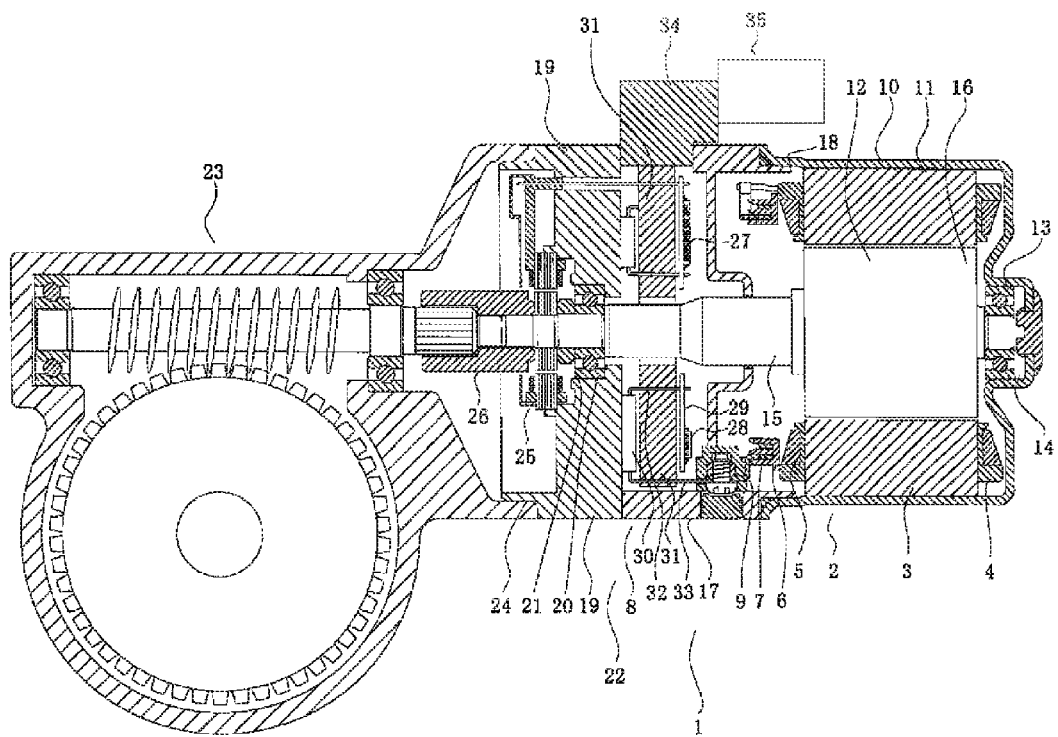
FIG. 1 is a sectional view including a speed reduction mechanism, which shows a rotary electric machine according to Embodiment 1 of the present invention.
Figure 2:
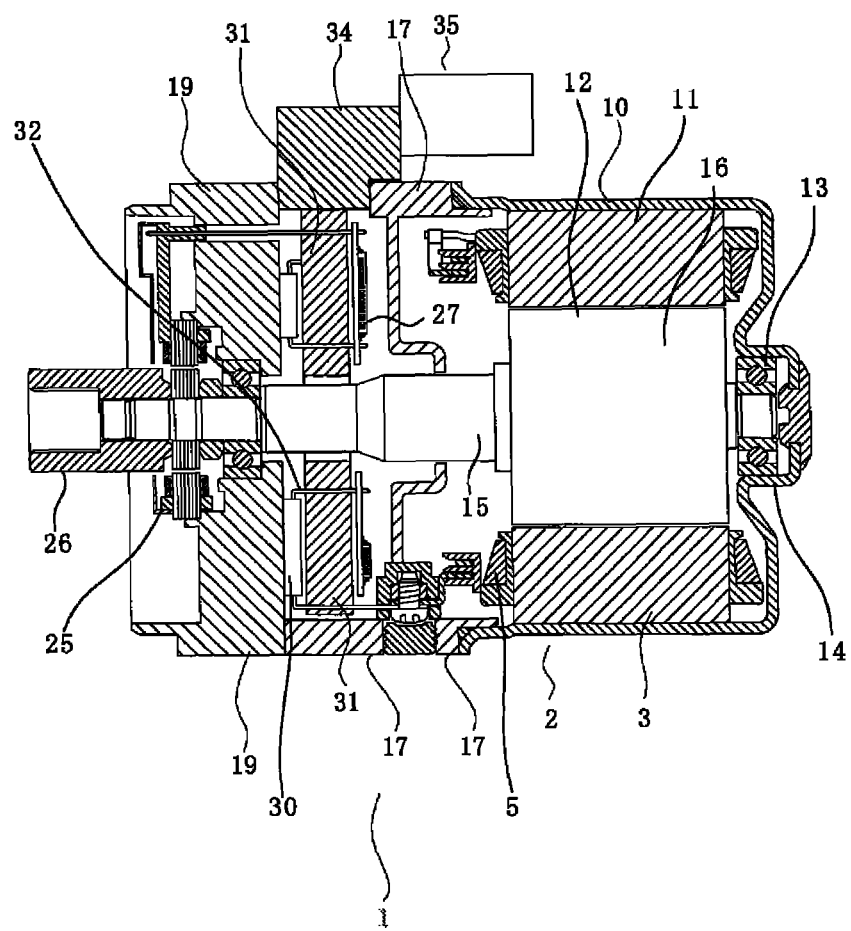
FIG. 2 is an axial sectional view showing the rotary electric machine according to Embodiment 1 of the present invention.
Figure 3:
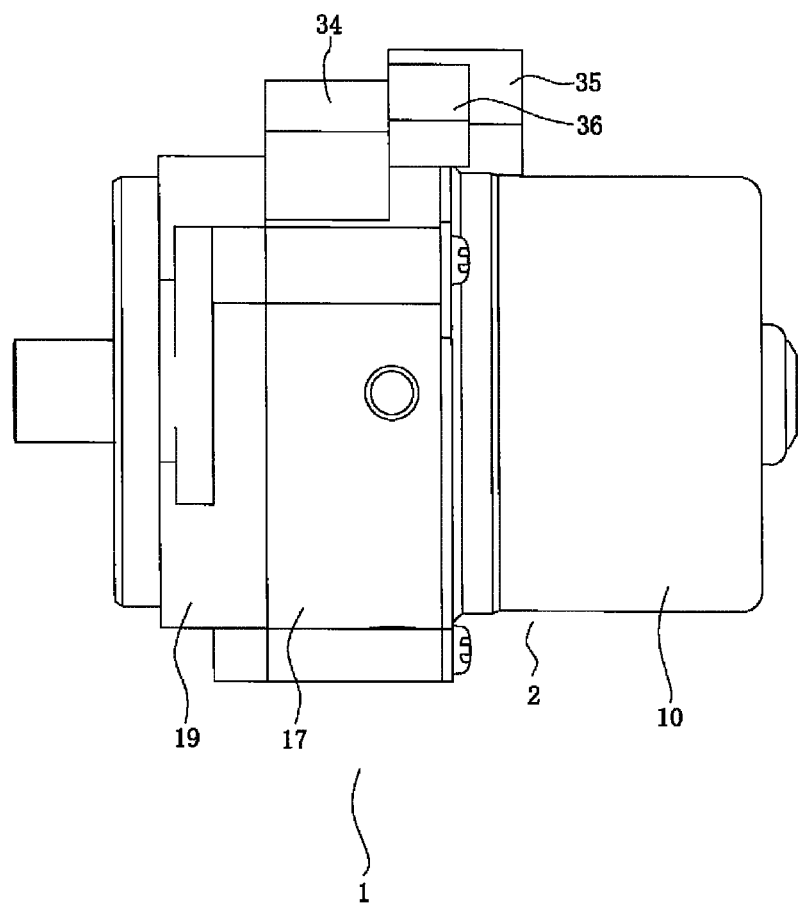
FIG. 3 is a side view showing the rotary electric machine according to Embodiment 1 of the present invention.
Figure 4:
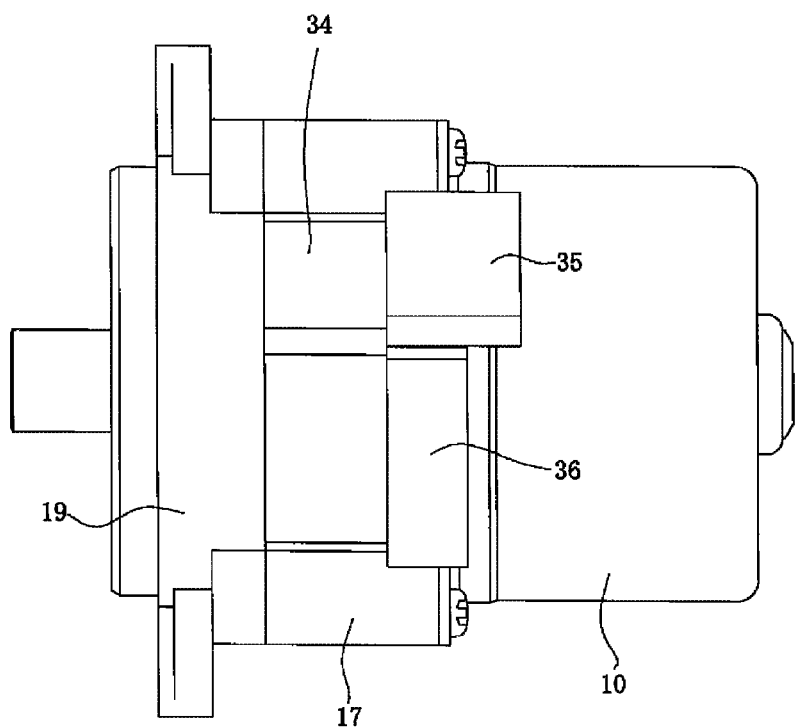
FIG. 4 is a top view showing the rotary electric machine according to Embodiment 1 of the present invention.
Figure 5:
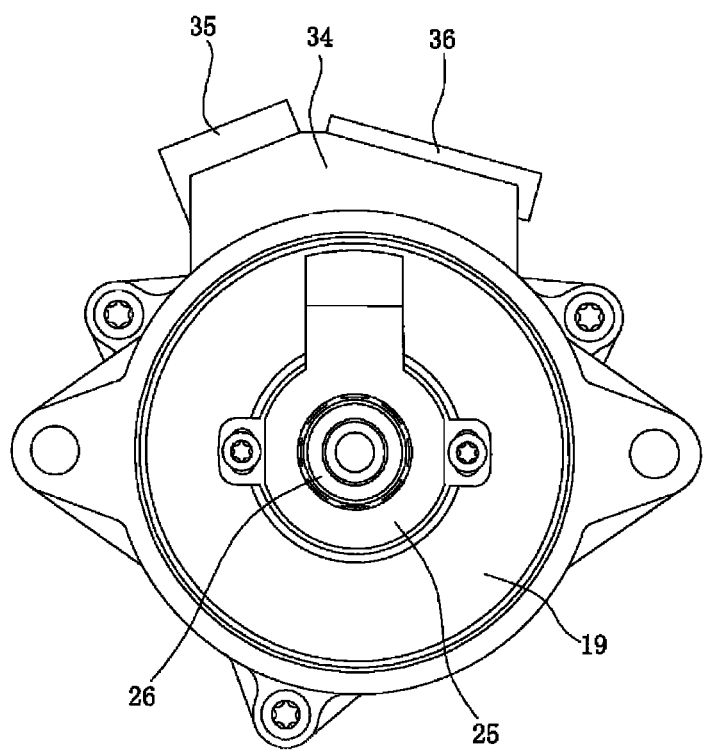
FIG. 5 is a front view showing the rotary electric machine according to Embodiment 1 of the present invention.
Figure 6:
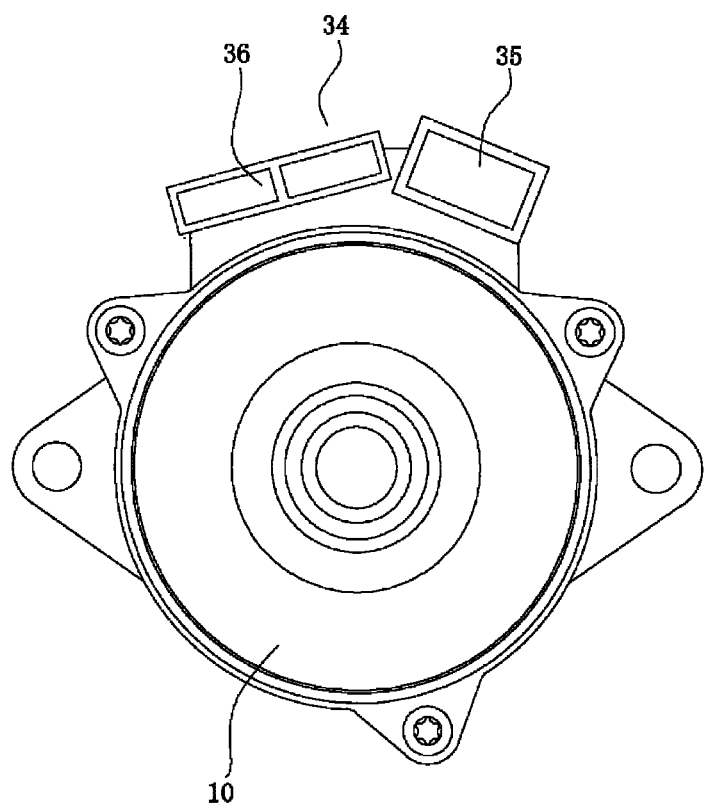
FIG. 6 is a rear view showing the rotary electric machine according to Embodiment 1 of the present invention.

Embodiment 1 of the present invention will be described with reference to FIG. 1 to FIG. 6. FIG. 1 is a sectional view including a speed reduction mechanism, which shows a rotary electric machine according to Embodiment 1 of the present invention, FIG. 2 is an axial sectional view showing the rotary electric machine according to Embodiment 1 of the present invention. FIG. 3 is a side view showing the rotary electric machine according to Embodiment 1 of the present invention. FIG. 4 is a top view showing the rotary electric machine according to Embodiment 1 of the present invention. FIG. 5 is a front view showing the rotary electric machine according to Embodiment 1 of the present invention. FIG. 6 is a rear view showing the rotary electric machine according to Embodiment 1 of the present invention.

In FIG. 1 to FIG. 6, a rotary electric machine 2 is a permanent magnet synchronous motor; and a three-phase stator winding 5 is wound around a stator core 3 which is formed by laminating magnetic steel sheets, via a resin-made insulator 4. Respective phase windings are connected in star or delta by winding terminals 7 incorporated in a resin-made terminal holder 6.

Motor terminals 9 which are for electrically connecting to a driving device 8 are attached to the winding terminals 7. The stator core 3 is inserted with force into an iron-made frame 10 to form a stator 11 of the motor. A bottom portion is provided on one end portion of the frame 10; and at a central portion of the bottom portion, a rear bearing box portion 14 for accommodating a rear bearing 13 which is for supporting one end of a rotor 12 is formed.

Magnets 16 for forming a field system are attached to an outer peripheral portion of a shaft 15 of the rotor 12. The other end portion of the frame 10 is opened and a spigot joint portion 18 which is for joining to a housing 17 of the driving device 8 is formed. The housing 17 is formed by a resin molding; and the housing 17 is joined to a heat sink 19 of the driving device 8 on one end thereof.

In this case, the connection between the housing 17 and the heat sink 19 is made by clamping together with the frame 10. The heat sink 19 is formed by a die cast molding of aluminum alloy; and at a central portion of the heat sink, a front bearing box portion 21 for accommodating a front bearing 20 which is for supporting one end of the rotor is formed. The housing 17 and the heat sink 19 constitute a driving device accommodating portion 22.

An attaching spigot joint portion 24 which is for attaching to a speed reduction mechanism 23 is provided on the other end portion of the heat sink 19. A resolver serving as a rotation sensor 25 is attached to a central portion on the front side of the heat sink 19. A boss 26 serving as a coupling which is for joining to the speed reduction mechanism 23 is attached on an end portion on the front side of the shaft 15.

The driving device 8 has a glass epoxy-made control substrate 29 on which a microcomputer 27 and a field effect transistor (FET) driving circuit 28 are mounted and power circuits 30 on which a power element such as a power metal oxide semiconductor field effect transistor (MOSFET) is mounted. There is provided, between the control substrate 29 and the power circuits 30, a lead frame 31 in which copper-made terminals (not shown in the drawing) through which electric power is supplied to the power circuits 30 and copper-made terminals (not shown in the drawing) which connect the power circuit 30 to other power circuit 30, the power circuit 30 to a capacitor (not shown in the drawing), and a coil to other coil (not shown in the drawing) are insert-molded with resin to be integrally formed.

Copper-made terminals (not shown in the drawing) which connect the connector portion 34 to the control substrate 29 and the connector portion 34 to the power circuit 30 are also insert-molded in the lead frame 31. The power circuits 30 are provided so as to be firmly attached to an inside wall of the heat sink 19 and are configured to transmit heat emitted from the power elements to the heat sink 19.

A power circuit 30 is provided with a power circuit signal terminal 32 and a power circuit motor terminal 33; the power circuit signal terminal 32 is connected to the control substrate 29; and the power circuit motor terminal 33 is connected to the motor terminal 9.

The capacitor (not shown in the drawing) which absorbs ripples of a current flowing through the rotary electric machine 2 is accommodated in the heat sink 19, and is connected to the power circuit 30 via a terminal (not shown in the drawing) Furthermore, a coil (not shown in the drawing) which absorbs noise is also accommodated in the heat sink 19, and is connected to the connector portion 34 via a terminal (not shown in the drawing). A power supply connector 35 and a signal connector 36 are provided on the connector portion 34.

In the thus configured coaxially integrated driving device and rotary electric machine, the coaxially integrated driving device and rotary electric machine can be configured by stacking three portions of the heat sink 19, the housing 17, and the frame 10 in the axial direction of the rotary electric machine. Consequently, as compared before, the number of components is reduced, assembly becomes easier, and reduction in weight is achieved by resinification of components.

Furthermore, the power circuit 30 is directly attached to the heat sink 19; and therefore, good heat dissipation properties can be secured in combination with a heat transmission effect from the heat sink 19 to the speed reduction mechanism 23. Further, the frame 10 of the rotary electric machine 2 is attached to the heat sink 19 via the resin-made housing 17; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 2

Figure 7:
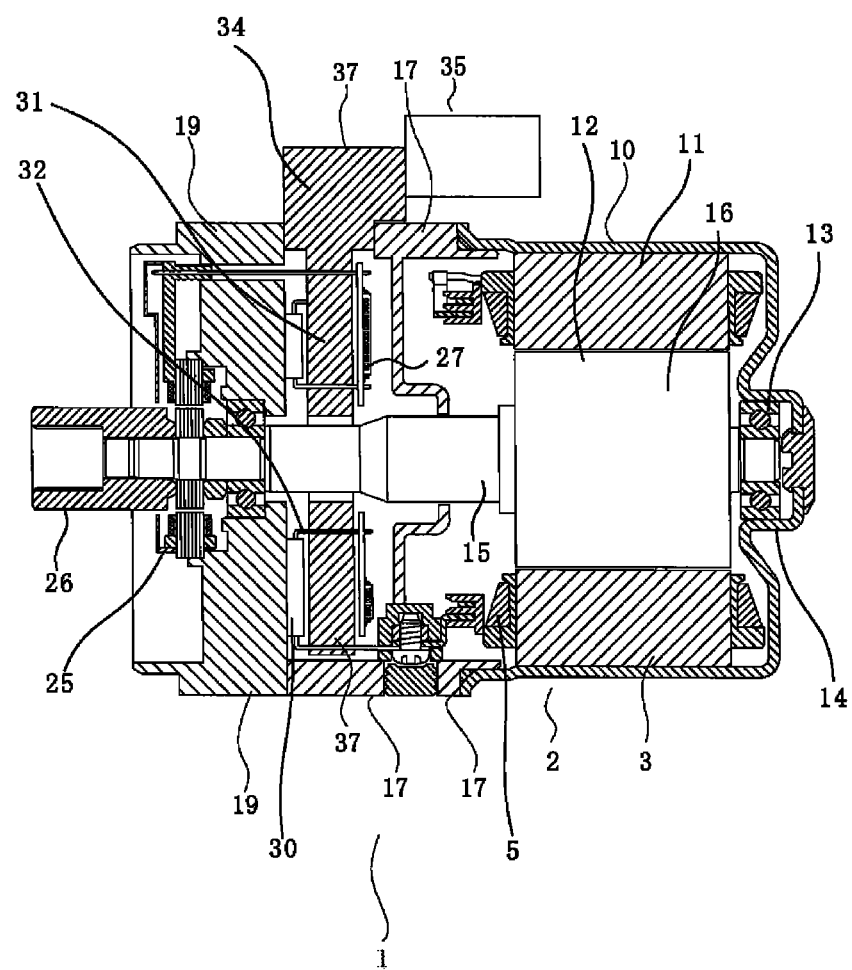
FIG. 7 is an axial sectional view showing a rotary electric machine according to Embodiment 2 of the present invention.
Figure 8:
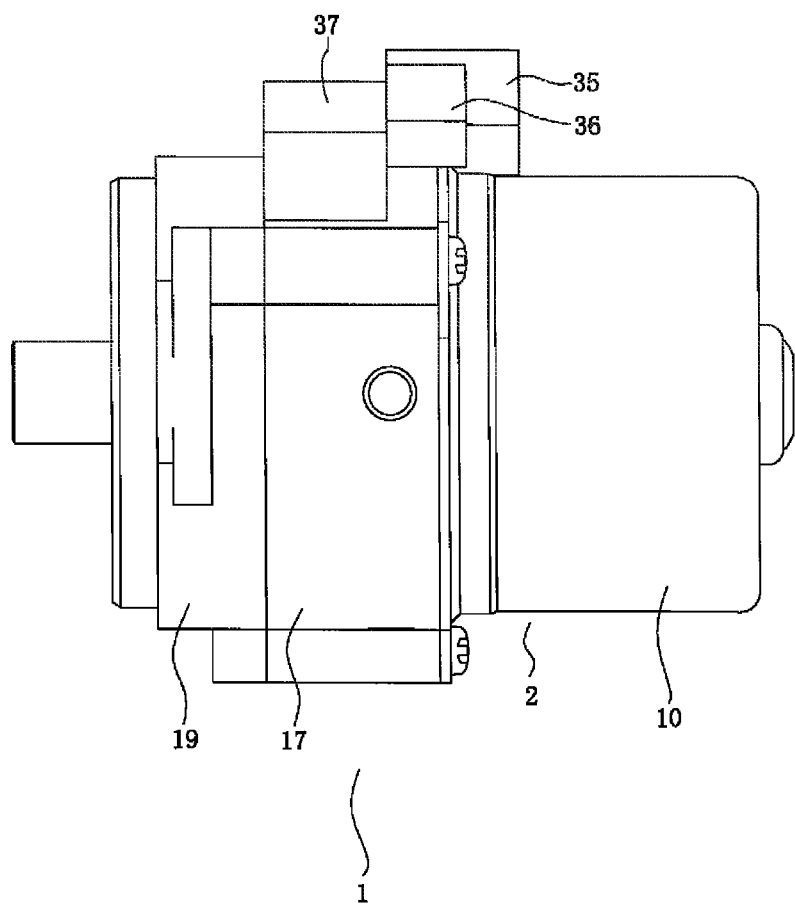
FIG. 8 is a side view showing the rotary electric machine according to Embodiment 2 of the present invention.

Embodiment 2 of the present invention will be described with reference to FIG. 7 and FIG. 8. FIG. 7 is an axial sectional view showing a rotary electric machine according to Embodiment 2 of the present invention. FIG. 8 is a side view showing the rotary electric machine according to Embodiment 2 of the present invention. The rotary electric machine in this Embodiment 2 is different as compared to the aforementioned Embodiment 1 in that, a connector portion 34 and a lead frame 31 are integrally formed by a resin molding to be an integrated connector portion and lead frame 37.

In the thus configured rotary electric machine, the rotary electric machine can be configured by stacking three portions of a heat sink 19, a housing 17, and a frame 10 in the axial direction of the rotary electric machine; and the lead frame 31 and the connector portion 34 are further integrated to be the integrated connector portion and lead frame 37. Consequently, as compared to the aforementioned conventional one, the number of components is further reduced, assembly becomes easier, and reduction in weight is achieved by resinification of components.

Furthermore, a power circuit 30 is directly attached to the heat sink 19; and therefore, good heat dissipation properties can be secured in combination with a heat transmission effect from the heat sink 19 to a speed reduction mechanism 23. Further, the frame 10 of the rotary electric machine 2 is attached to the heat sink 19 via the resin-made housing 17; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 3

Figure 9:
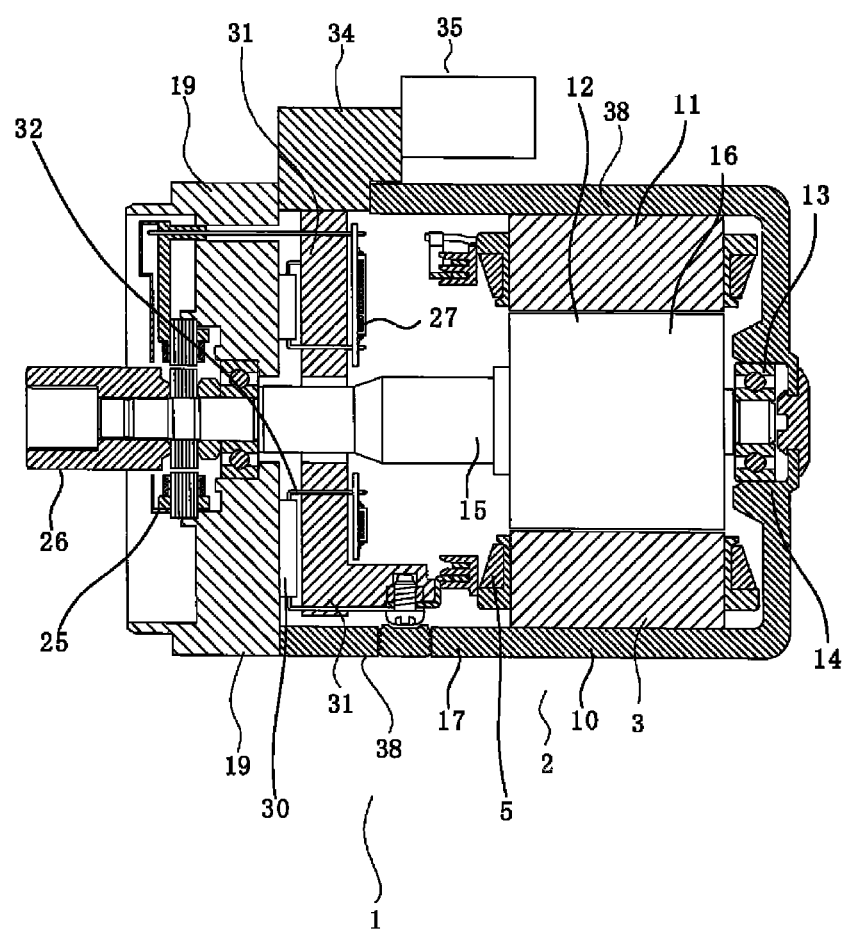
FIG. 9 is an axial sectional view showing a rotary electric machine according to Embodiment 3 of the present invention.
Figure 10:
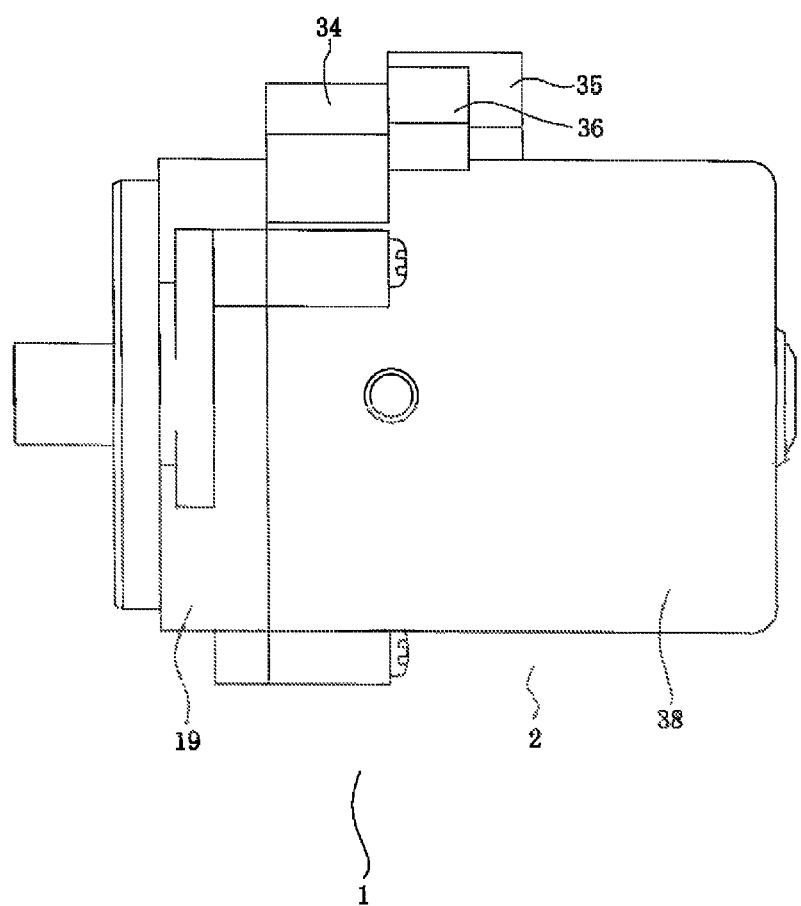
FIG. 10 is a side view showing the rotary electric machine according to Embodiment 3 of the present invention.

Embodiment 3 of the present invention will be described with reference to FIG. 9 and FIG. 10. FIG. 9 is an axial sectional view showing a rotary electric machine according to Embodiment 3 of the present invention. FIG. 10 is a side view showing the rotary electric machine according to Embodiment 3 of the present invention. The rotary electric machine in this Embodiment 3 is different as compared to the aforementioned Embodiment 1 in that, a housing 17 and a frame 10 are integrally formed by a resin molding to be an integrated housing and frame 38.

In the thus configured rotary electric machine, the rotary electric machine can be configured by stacking two portions of a heat sink 19 and the integrated housing and frame 38 in the axial direction of the rotary electric machine; and the housing 17 and the frame 10 are further integrated to be the integrated housing and frame 38. Consequently, as compared to the aforementioned conventional one, the number of components is further reduced, assembly becomes easier, and reduction in weight is further achieved by resinification of also the frame 10 in addition to the housing 17.

Furthermore, a power circuit 30 is directly attached to the heat sink 19; and therefore, good heat dissipation properties can be secured in combination with a heat transmission effect from the heat sink 19 to a speed reduction mechanism 23. Further, the frame 10 of the rotary electric machine 2 is made of resin and is integrated with the housing 17 to be the integrated housing and frame 38; and consequently, rigidity of the frame is improved and the vibration of the rotary electric machine 2 can be suppressed.

Further, the rotary electric machine 2 is attached to the heat sink 19 via the resin-made integrated housing and frame 38; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 4

Figure 11:
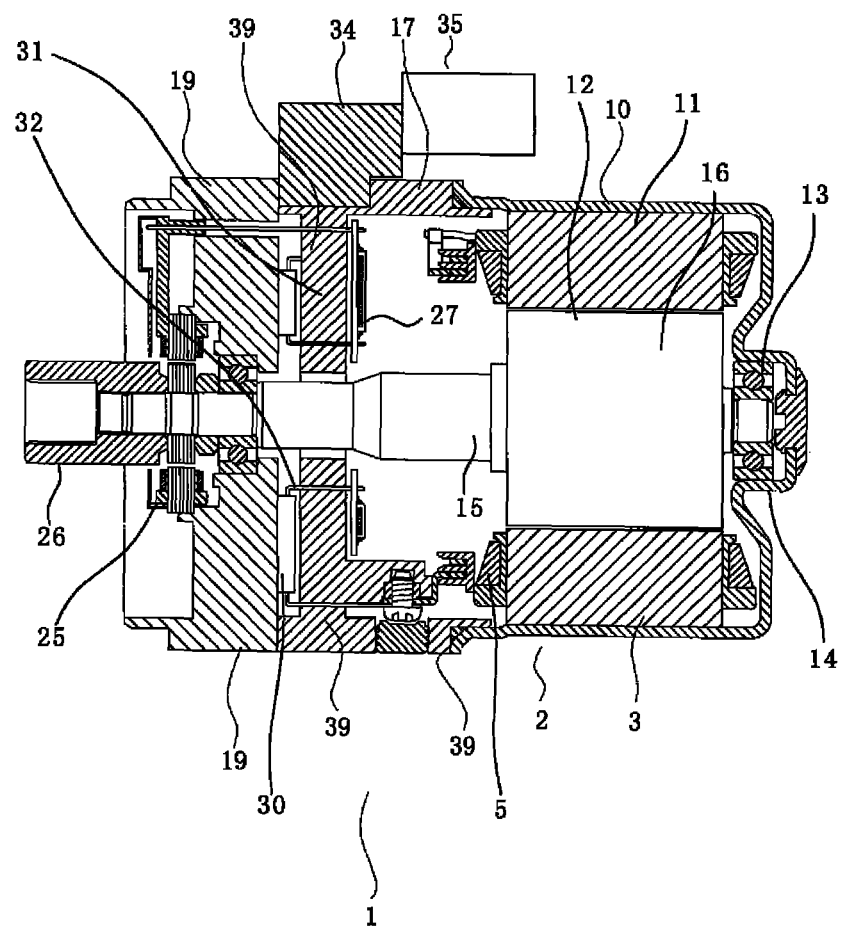
FIG. 11 is an axial sectional view showing a rotary electric machine according to Embodiment 4 of the present invention.
Figure 12:
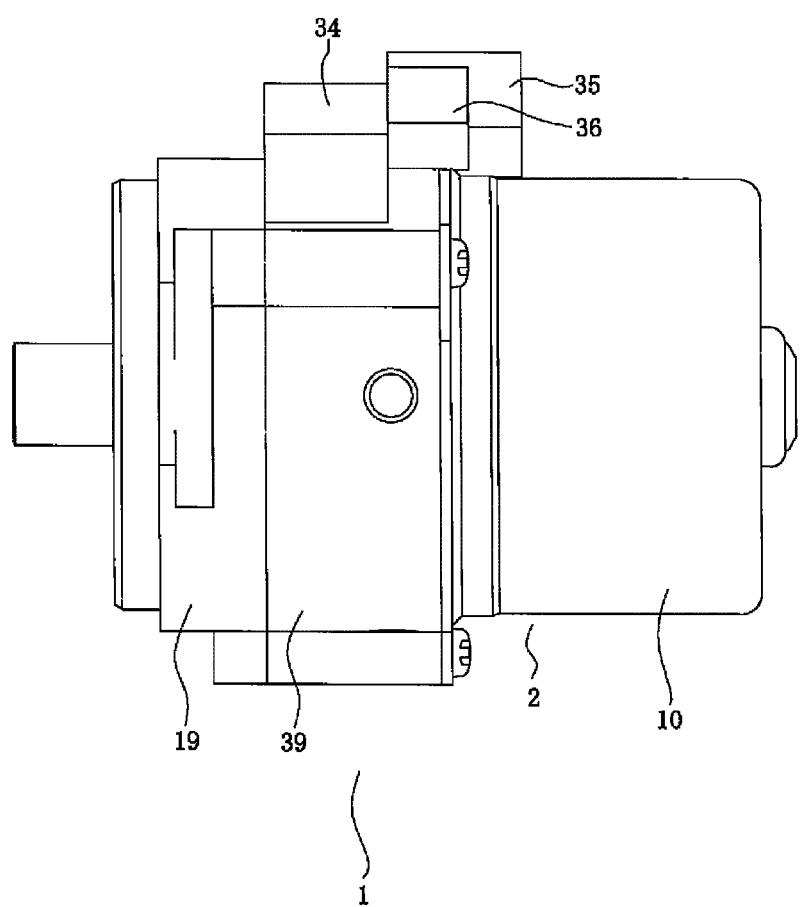
FIG. 12 is a side view showing the rotary electric machine according to Embodiment 4 of the present invention.

Embodiment 4 of the present invention will be described with reference to FIG. 11 and FIG. 12. FIG. 11 is an axial sectional view showing a rotary electric machine according to Embodiment 4 of the present invention. FIG. 12 is a side view showing the rotary electric machine according to Embodiment 4 of the present invention. The rotary electric machine in this Embodiment 4 is different as compared to the aforementioned Embodiment 1 in that, a lead frame 31 and a housing 17 are integrally formed by a resin molding to be an integrated lead frame and housing 39.

In the thus configured rotary electric machine, the rotary electric machine can be configured by stacking three portions of a heat sink 19, the integrated lead frame and housing 39, and a frame 10 in the axial direction of the rotary electric machine; and the lead frame 31 and the housing 17 are further integrated to be the integrated lead frame and housing 39. Consequently, as compared to the aforementioned conventional one, the number of components is further reduced, assembly becomes easier, and reduction in weight is achieved by resinification of components.

Furthermore, a power circuit 30 is directly attached to the heat sink 19; and therefore, good heat dissipation properties can be secured in combination with a heat transmission effect from the heat sink 19 to a speed reduction mechanism 23. Further, the frame 10 of the rotary electric machine 2 is attached to the heat sink 19 via the resin-made integrated lead frame and housing 39; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 5

Figure 13:
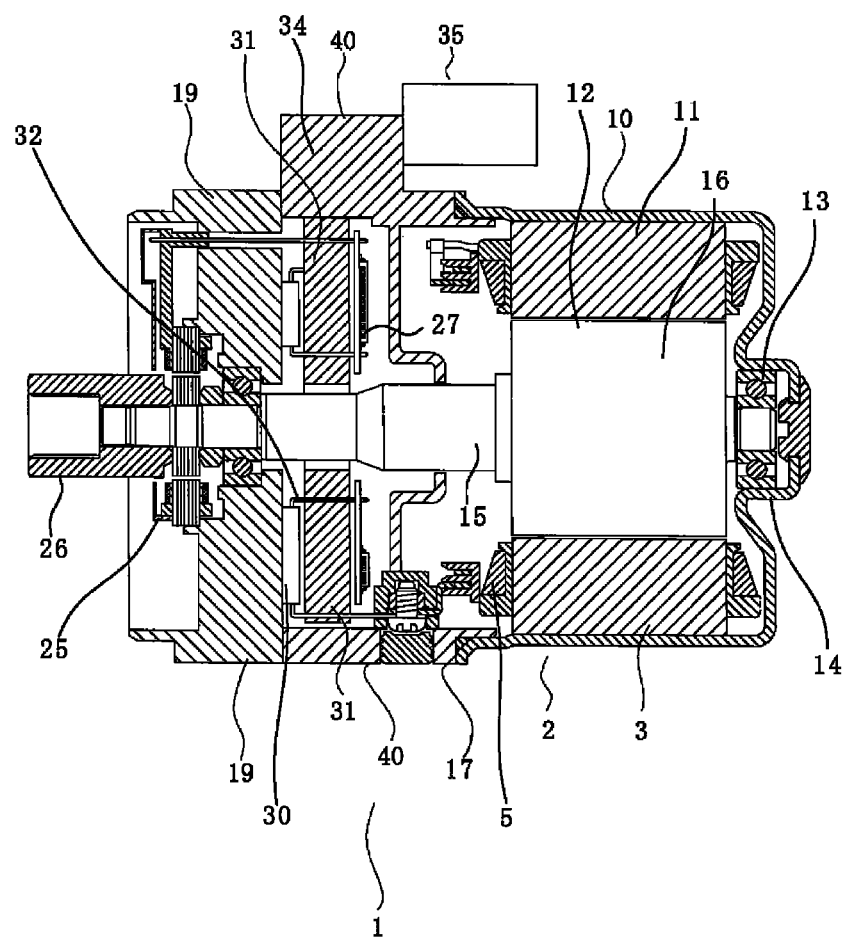
FIG. 13 is an axial sectional view showing a rotary electric machine according to Embodiment 5 of the present invention.
Figure 14:
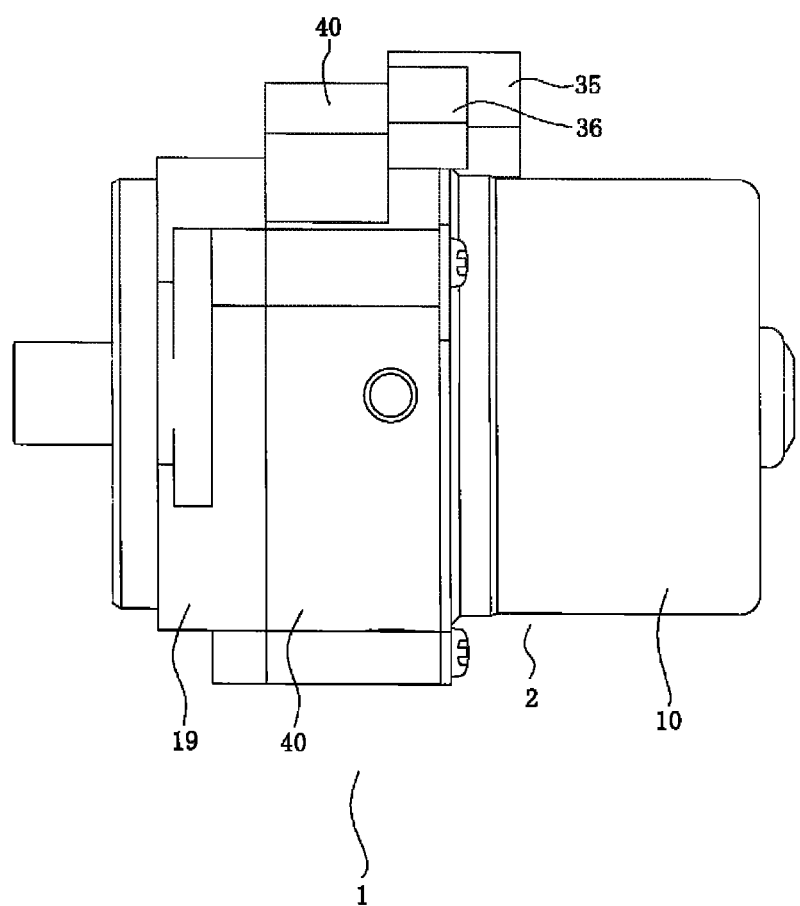
FIG. 14 is a side view showing the rotary electric machine according to Embodiment 5 of the present invention.

Embodiment 5 of the present invention will be described with reference to FIG. 13 and FIG. 14. FIG. 13 is an axial sectional view showing a rotary electric machine according to Embodiment 5 of the present invention. FIG. 14 is a side view showing the rotary electric machine according to Embodiment 5 of the present invention. The rotary electric machine in this Embodiment 5 is different as compared to the aforementioned Embodiment 1 in that, a connector portion 34 and a housing 17 are integrally formed by a resin molding to be an integrated connector portion and housing 40.

In the thus configured rotary electric machine, the rotary electric machine can be configured by stacking three portions of a heat sink 19, the integrated connector portion and housing 40, and a frame 10 in the axial direction of the rotary electric machine; and the connector portion 34 and the housing 17 are further integrated to be the integrated connector portion and housing 40. Consequently, as compared to the aforementioned conventional one, the number of components is further reduced, assembly becomes easier, and reduction in weight is achieved by resinification of components.

Furthermore, a power circuit 30 is directly attached to the heat sink 19; and therefore, good heat dissipation properties can be secured in combination with a heat transmission effect from the heat sink 19 to a speed reduction mechanism 23. Further, the frame 10 of the rotary electric machine 2 is attached to the heat sink 19 via the resin-made integrated connector portion and housing 40; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 6

Figure 15:
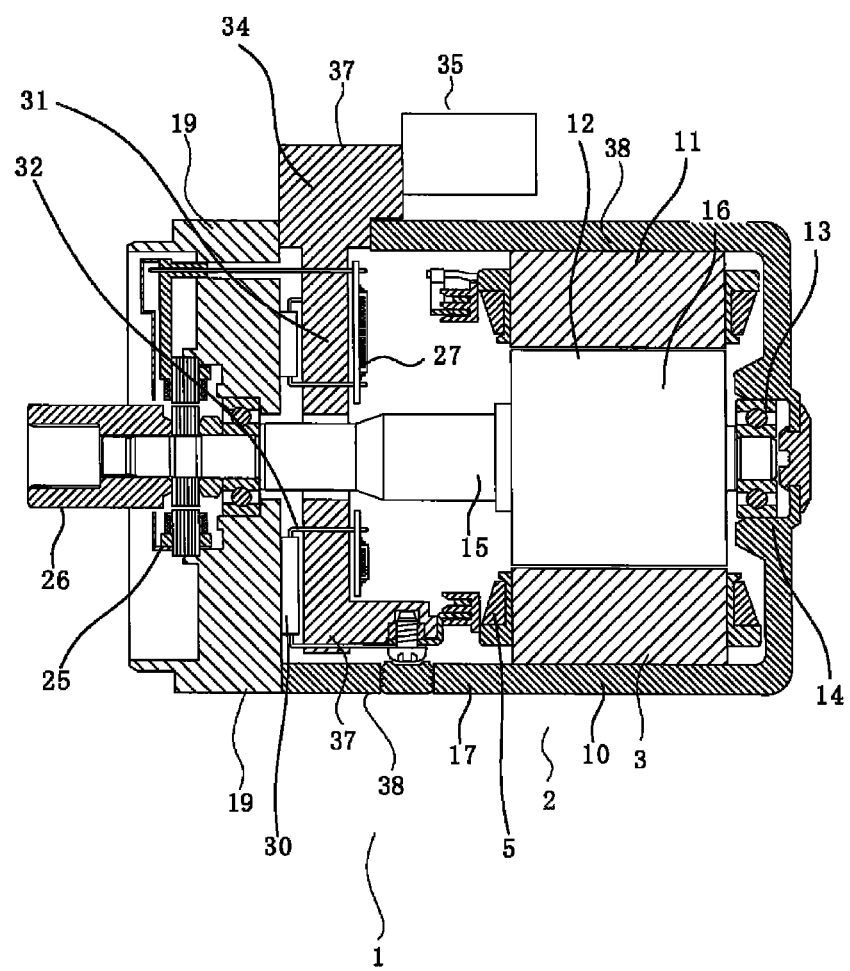
FIG. 15 is an axial sectional view showing a rotary electric machine according to Embodiment 6 of the present invention.
Figure 16:
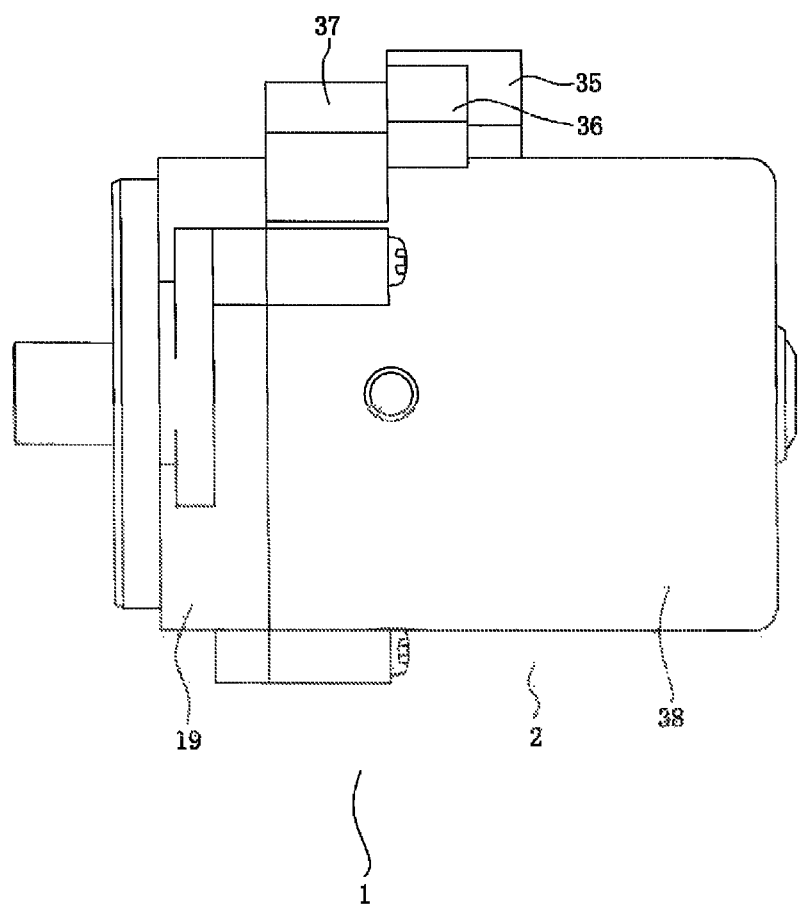
FIG. 16 is a side view showing the rotary electric machine according to Embodiment 6 of the present invention.

Embodiment 6 of the present invention will be described with reference to FIG. 15 and FIG. 16. FIG. 15 is an axial sectional view showing a rotary electric machine according to Embodiment 6 of the present invention. FIG. 16 is a side view showing the rotary electric machine according to Embodiment 6 of the present invention. The rotary electric machine in this Embodiment 6 is different as compared to the aforementioned Embodiment 2 in that, in addition to that in which a connector portion 34 and a lead frame 31 are integrally formed by a resin molding to be an integrated connector portion and lead frame 37, a housing 17 and a frame 10 are integrally formed by a resin molding to be an integrated housing and frame 38.

In the thus configured rotary electric machine, the rotary electric machine can be configured by stacking two portions of a heat sink 19 and the integrated housing and frame 38 in the axial direction of the rotary electric machine. Further, in addition to that in which the connector portion 34 and the lead frame 31 are further integrated to be the integrated connector portion and lead frame 37, the housing 17 and the frame 10 are integrated to be the integrated housing and frame 38. Consequently, as compared to the aforementioned conventional one, the number of components is further reduced, assembly becomes easier, and reduction in weight is further achieved by resinification of also the frame in addition to the housing.

Furthermore, a power circuit 30 is directly attached to the heat sink 19; and therefore, good heat dissipation properties can be secured in combination with a heat transmission effect from the heat sink 19 to a speed reduction mechanism 23. Further, the frame of the rotary electric machine 2 is made of resin and is integrated with the housing to be the integrated housing and frame 38; and consequently, rigidity of the frame is improved and the vibration of the rotary electric machine 2 can be further suppressed.

Further, the rotary electric machine 2 is attached to the heat sink 19 via the resin-made integrated housing and frame 38; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 7

Figure 17:
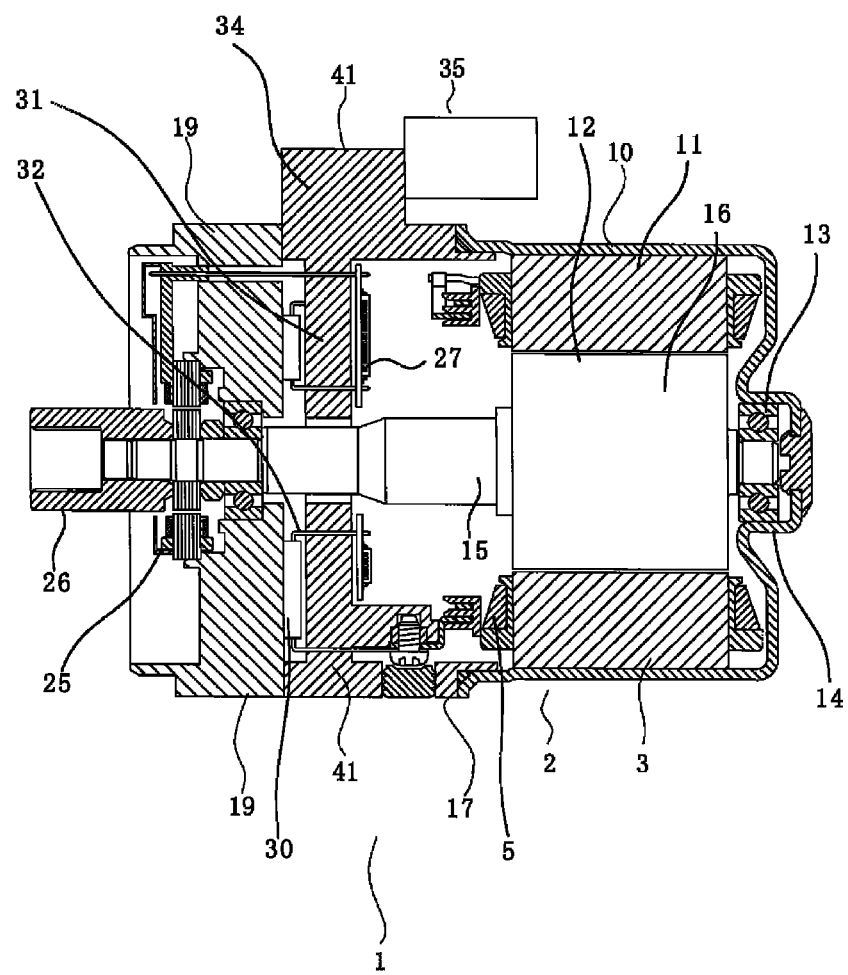
FIG. 17 is an axial sectional view showing a rotary electric machine according to Embodiment 7 of the present invention.
Figure 18:
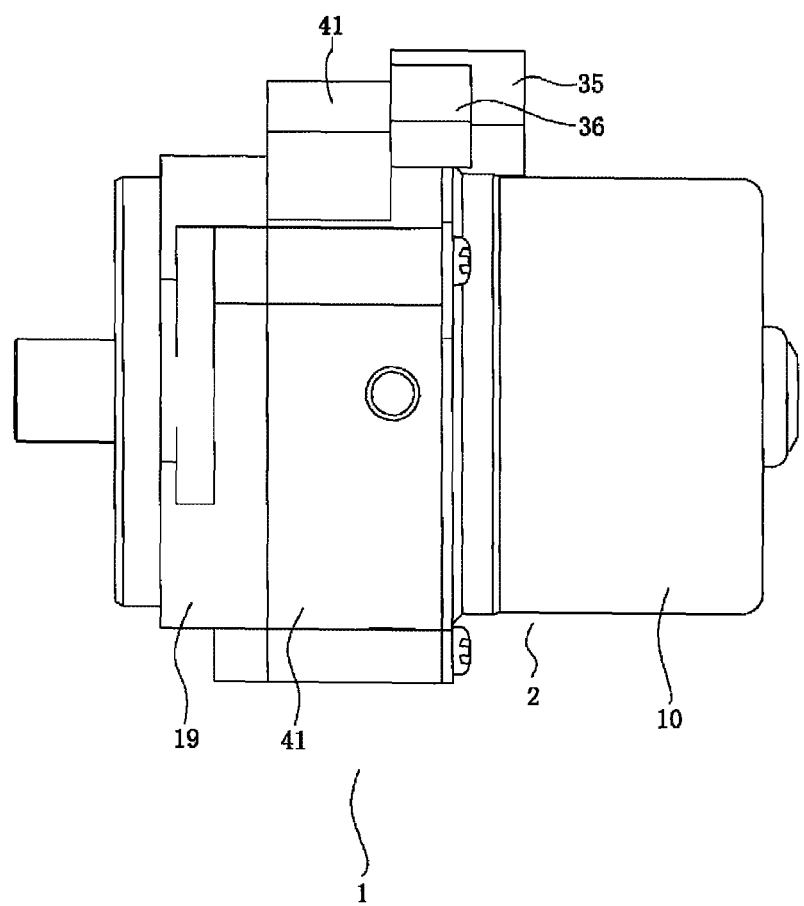
FIG. 18 is a side view showing the rotary electric machine according to Embodiment 7 of the present invention.

Embodiment 7 of the present invention will be described with reference to FIG. 17 and FIG. 18. FIG. 17 is an axial sectional view showing a rotary electric machine according to Embodiment 7 of the present invention. FIG. 18 is a side view showing the rotary electric machine according to Embodiment 7 of the present invention. The rotary electric machine in this Embodiment 7, is different as compared to the aforementioned Embodiment 2 in that, in addition to a connector portion 34 and a lead frame 31, a housing 17 is further integrally formed by a resin molding to be an integrated connector portion, lead frame, and housing 41.

In the thus configured rotary electric machine, the rotary electric machine can be configured by stacking three portions of a heat sink 19; the integrated connector portion, lead frame, and housing 41; and a frame 10 in the axial direction of the rotary electric machine. Further, in addition to the connector portion 34 and the lead frame 31, the housing 17 is further integrated to be the integrated connector portion, lead frame, and housing 41, Consequently, as compared to the aforementioned conventional one, the number of components is further reduced, assembly becomes easier, and reduction in weight is achieved by resinification of components.

Furthermore, a power circuit 30 is directly attached to the heat sink 19; and therefore, good heat dissipation properties can be secured in combination with a heat transmission effect from the heat sink 19 to a speed reduction mechanism 23. Further, the frame 10 of the rotary electric machine 2 is attached to the heat sink 19 via the resin-made integrated connector portion, lead frame, and housing 41; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 8

Figure 19:
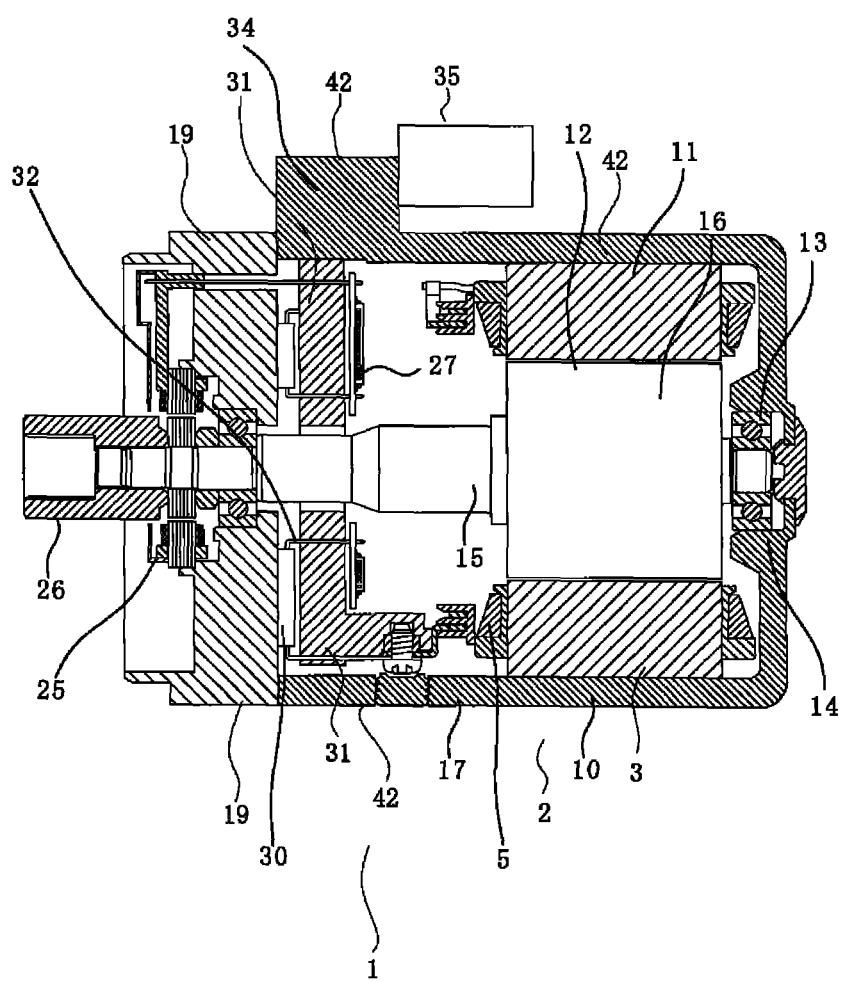
FIG. 19 is an axial sectional view showing a rotary electric machine according to Embodiment 8 of the present invention.
Figure 20:
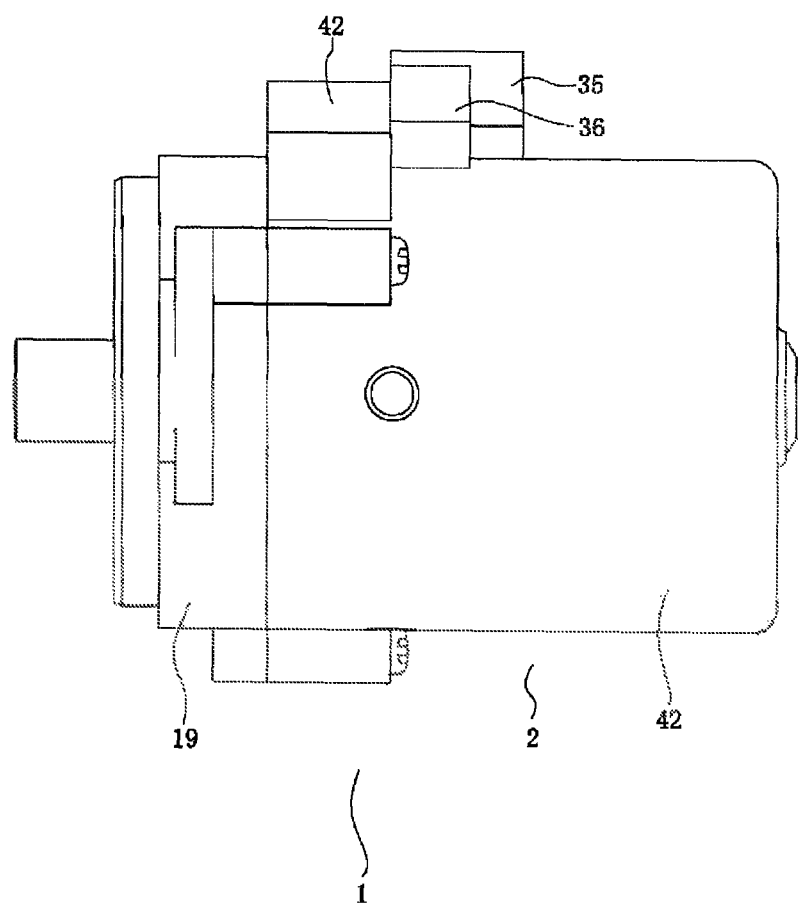
FIG. 20 is a side view showing the rotary electric machine according to Embodiment 8 of the present invention.

Embodiment 8 of the present invention will be described with reference to FIG. 19 and FIG. 20. FIG. 19 is an axial sectional view showing a rotary electric machine according to Embodiment 8 of the present invention. FIG. 20 is a side view showing the rotary electric machine according to Embodiment 8 of the present invention. The rotary electric machine in this Embodiment 8 is different as compared to the aforementioned Embodiment 3 in that, in addition to a housing 17 and a frame 10, a connector portion 34 is further integrally formed by a resin molding to be an integrated connector portion, housing, and frame 42.

In the thus configured rotary electric machine, the rotary electric machine can be configured by stacking two portions of a heat sink 19 and the integrated connector portion, housing, and frame 42 in the axial direction of the rotary electric machine. Further, in addition to the housing 17 and the frame 10, the connector portion 34 is integrated to be the integrated connector portion, housing, and frame 42. Consequently, as compared to the aforementioned conventional one, the number of components is further reduced, assembly becomes easier, and reduction in weight is further achieved by resinification of also the frame in addition to the housing.

Furthermore, a power circuit 30 is directly attached to the heat sink 19; and therefore, good heat dissipation properties can be secured in combination with a heat transmission effect from the heat sink 19 to a speed reduction mechanism 23. Further, the frame of the rotary electric machine 2 is made of resin and is integrated with the housing to be the integrated connector portion, housing, and frame 42; and consequently, rigidity of the frame is improved and the vibration of the rotary electric machine 2 can be further suppressed.

Further, the rotary electric machine 2 is attached to the heat sink 19 via the resin-made integrated connector portion, housing, and frame 42; and therefore, the vibration of the rotary electric machine 2 can be suppressed from being transmitted to the speed reduction mechanism 23 by the vibration damping effect of resin material and the generation of noise due to resonance with the speed reduction mechanism 23 and a member to which the speed reduction mechanism is attached can be suppressed.

Embodiment 9

Embodiment 9 is one in which any of the rotary electric machine of the aforementioned Embodiment 1 to Embodiment 8 is applied to an electric power steering apparatus.

In the thus configured rotary electric machine, the vibration of a rotary electric machine 2 can be suppressed from being transmitted to a speed reduction mechanism 23, the generation of noise due to resonance with the speed reduction mechanism 23 and a vehicle body to which the speed reduction mechanism is attached can be suppressed, and the silent properties of a vehicle can be improved. Further, the rotary electric machine is lightweight and therefore reduction in weight of the vehicle is achieved; and therefore, effects exist that fuel consumption of the vehicle is improved and the amount of emission of carbon dioxide can be reduced.

INDUSTRIAL APPLICABILITY

The present invention is suitable for achieving a rotary electric machine which is lightweight, is easy in assembly, can reduce the number of components, and can suppress the vibration of a motor from being transmitted to members on the other side while securing the heat dissipation properties of a power circuit.

The invention claimed is:

1. A rotary electric machine comprising:
a heat sink mounted with a power circuit;
a housing for containing incorporated components; and
a frame for containing a rotor and a stator core;
said heat sink, said housing, and said frame being coaxially and integrally configured, wherein
said rotary electric machine further comprising:
a lead frame connected to said power circuit, and
a connector portion connected to said lead frame and being for connecting to the outside;
said heat sink is made of metal; and
said housing is made of resin and comprises a partition portion extending in a radial direction of the rotary electric machine to separate the rotor and stator core from a control substrate mourned on said lead frame.

2. The rotary electric machine according to claim 1, wherein said lead frame and said connector portion are integrally formed by resin molding to be an integrated connector portion and lead frame.

3. The rotary electric machine according to claim 2, wherein said housing and said frame are integrally formed by resin molding to be an integrated housing and frame.

4. The rotary electric machine according to claim 3, wherein said rotary electric machine is applied to an electric power steering apparatus.

5. The rotary electric machine according to claim 2, wherein, in addition to said connector portion and said lead frame, said housing is further integrally formed by resin molding to be an integrated connector portion, lead frame, and housing.

6. The rotary electric machine according to claim 5, wherein said rotary electric machine is applied to an electric power steering apparatus.

7. The rotary electric machine according to claim 2, wherein said rotary electric machine is applied to an electric power steering apparatus.

8. The rotary electric machine according to claim 1, wherein said housing and said frame are integrally formed by resin molding to be an integrated housing and frame.

9. The rotary electric machine according to claim 8, wherein, in addition to said housing and said frame, said connector portion is further integrally formed by resin molding to be an integrated connector portion, housing, and frame.

10. The rotary electric machine according to claim 9, wherein said rotary electric machine is applied to an electric power steering apparatus.

11. The rotary electric machine according to claim 8, wherein said rotary electric machine is applied to an electric power steering apparatus.

12. The rotary electric machine according to claim 1, wherein said lead frame and said housing are integrally formed by resin molding to be an integrated lead frame and housing.

13. The rotary electric machine according to claim 12, wherein said rotary electric machine is applied to an electric power steering apparatus.

14. The rotary electric machine according to claim 1, wherein said connector portion and said housing are integrally formed by resin molding to be an integrated connector portion and housing.

15. The rotary electric machine according to claim 14, wherein said rotary electric machine is applied to an electric power steering apparatus.

16. The rotary electric machine according to claim 1, wherein said rotary electric machine is applied to an electric power steering apparatus.

17. The rotary electric machine according to claim 1, wherein said power circuit is connected to said lead frame on a first side of the lead frame a control substrate is connected to said lead frame on a second side opposite to the first side.

18. The rotary electric machine according to claim 17, wherein said power circuit is connected to said control substrate via metal terminals through said lead frame.

* * * * *